United States Patent Office 3,227,576
Patented Jan. 4, 1966

3,227,576
DRAFTING FILM
Albert Louis Van Stappen, Rumson, N.J., assignor to E. I. du Pont de Nemours and Company, Wilmington, Del., a corporation of Delaware
No Drawing. Filed May 17, 1960, Ser. No. 29,580
The portion of the term of the patent subsequent to Dec. 13, 1977, has been disclaimed
10 Claims. (Cl. 117—76)

This invention relates to flexible translucent coated film for drafting purposes. More particularly, the invention relates to such drafting films having an improved surface for use with a wide variety of drafting pens and pencils. Still more particularly, the invention relates to such drafting films which may be conveniently photosensitized with any suitable composition such as light sensitive diazo compounds.

It is known to provide drafting materials consisting of cloth and paper on which there are coated layers of transparentizing materials and layers containing abrasive materials. It is also known to photosensitize such materials. These materials have a number of disadvantages. Paper becomes brittle with age and lacks strength and durability. Thus, it becomes creased and the corners become torn during drafting and in use of the final drawing. Tracing cloth is stronger but it likewise becomes brittle with age. It is also quite difficult and expensive to manufacture such cloths which are of uniform translucency. It requires in most cases, several costly coatings to provide the proper degree of transparency and the right amount of abrasiveness. In the case of both cloth and paper it is difficult to photosensitize because of the adverse effect of many of the transparentizing coatings on the photosensitive layers. Drafting sheets comprising a film base composed of vinyl copolymers, polyesters and polyamides are known. Such films have been coated with various resinous compositions including acrylic polymers and copolymers and/or heat hardenable phenolic resins containing toothing agents such as silica, titanium dioxide, diatomaceous earth, magnesium carbonate, etc. The above films offer advantages in tracing materials for drafting surfaces, particularly polyester films, e.g., polyethylene terephthalate. Such films are more dimensionally stable under varying atmospheric conditions than paper or cloth and do not require the application of transparentizing coatings. However, the coatings of the prior art have not been entirely suitable for drafting or tracing surfaces. The main disadvantage is lack of sufficient hardness of these coatings to resist being scratched or scribed by hard pencils. Another disadvantage is that the prior art methods of manufacture require that the layers for the drawing surfaces be coated on hydrophobic films from an organic solvent solution. Such methods of manufacture require more elaborate coating equipment including expensive solvent recovery systems.

The above-described disadvantages can be overcome and a dimensionally stable, durable, high quality drafting film provided in accordance with the invention. Pencil and ink designs can be drawn on the surfaces without smudging. The film is quite versatile in the drafting art and is capable of being easily and inexpensively photosensitized. This drafting film comprises a flexible, biaxially-oriented, macromolecular polyester film substantially composed of the polyesterification product of a dicarboxylic acid and a dihydric alcohol having on one or both surfaces, in order, (1) a thin layer (e.g., 0.5 mg./dm.$^2$ dry weight) of an adherent film-forming essentially hydrophobic organic copolymer and (2) a thin layer (e.g., 1 to 5 mils) of resin taken from the group consisting of polyamide and interpolyamide resins coated from an aqueous dispersion in which the resin particle size is from 0.1 to 10 microns and which may or may not contain dispersed, finely divided discrete particles of a water-insoluble, translucence-producing solid inorganic toothing agent.

The drafting film just described is shown schematically in the accompanying drawing which constitutes a part of this application. In the drawing, the flexible, biaxally oriented polyester film base 1 has coated thereon layer 2 composed of a vinylidene chloride copolymer which in turn carries layer 3 composed of a polyamide or interpolyamide resin having a particle size of 0.1 to 10 microns. Layer 3 may optically contain a translucence-producing solid inorganic toothing agent.

The drafting films provided by the invention may contain still other layers than those mentioned above. For example, there may be coated on one surface of the hydrophobic copolymer coated polyester base film one of the above-described interpolyamide or polyamide aqueous dispersions and on the opposite side of the polyester base film which also carries a hydrophobic copolymer layer, there may be coated an aqueous solution of a water-soluble amino- or amido-formaldehyde resin as described in assignee's copending U.S. application Serial No. 774,822, filed November 19, 1958, now U.S. Patent 2,964,423, issued December 13, 1960. The drafting films may also be made by coating both surfaces with the same or different aqueous dispersions of interpolyamides and polyamides. Suitable interpolyamides are disclosed in Brubaker et al., U.S. Patent 2,285,009, e.g., interpolyamides of at least three of the following polyamide-forming compositions: 6-aminocaproic acid, hexamethylenediamine-adipic acid salt, hexamethylenediamine-sebacic acid salt, mixed salts of hexamethylenediamine with suberic and azelaic acids, and their equivalent amide forming devivatives. Preferably, the interpolyamides suitable are those containing: 30 to 45% 6-aminocaproic acid, 10 to 50% hexamethylenediammonium adipate and 10 to 45% hexamethylenediammonium sebacate having a melting point of at least 140° C. and a modulus of stiffness of about $20 \times 10^3$ to about $50 \times 10^3$ lbs./sq. in. Suitable polyamides are disclosed in Catlin, U.S. Patent 2,342,387, and Schupp, U.S. Patent 2,359,877.

In the preferred aspect of the invention, the copolymer coated polyester film used to make the drafting film has a thickness from 3 to 10 mils and is dimensionally stable under varying atmospheric conditions, that is, it exhibits a shrinkage of not more than 0.2% both in the longitudinal and lateral directions when heated free from tension to a temperature of 120° C. for a period of five minutes. Suitable copolymer-coated polyester films of the foregoing type are described in Alles, U.S. Patent 2,779,684, and in the patents referred to therein. The preferred films, however, have a polyethylene terephthalate base and a vinylidene chloride copolymer layer wherein the addition copolymer contains at least 35% by weight of vinylidene chloride.

Various conventional coating devices can be used to apply the aqueous dispersions of the polyamide and interpolyamide resins. Thus, the dispersions can be fed from a gravity-feed or pressure-fed hopper or they can be applied by dip-coating techniques or by means of bead coating or applicator rolls. The thickness of the coatings can be controlled by means of doctor blades or by means of air streams, e.g., air-doctor knives.

In general, the aqueous coating composition will contain from about 5% to 15% by weight of the polyamide or interpolyamide resin.

Toothing agents, while not essential, may be desirable in some cases. Silica, ground glass, titanium dioxide, chalk, talc, diatomaceous earth, and magnesium carbonate varying in particle size from about 0.1 to 10 microns may be added to the aqueous polyamide or interpolyamide dispersions.

In the preferred aspect of the invention, the oriented polyester film base has a vinylidene chloride/acrylic ester/itaconic acid copolymer containing such components in amounts by weight of 35 to 96%, 3.5 to 64.5% and 0.5 to 2.5%, respectively, on each surface of the oriented polyester base and the polyamide dispersion is coated on one or both layers of the copolymer. This copolymer layer is exceedingly thin, 0.5–4 mg./dm.$^2$ and is usually applied from an aqueous dispersion to the polyester base prior to orienting it and rendering it dimensionally stable. This vinylidene chloride copolymer coated base, preferably a polyethylene terephthalate film, can be made after the manner described in Alles et al., U.S. Patent 2,627,088, and Alles, U.S. Patent 2,779,684, and will exhibit shrinking of not more than 0.2% in both longitudinal and lateral directions when not under tension and heated to a temperature of 120° C. for a period of 5 minutes.

The various vinyl esters (including acrylonitrile) which can be used in making the vinylidene chloride copolymers, are those disclosed in the Alles et al. patent. A suitable copolymer may be composed of 75–95% vinylidene chloride, 4–20% methyl acrylate and 1–5% itaconic acid. The coating of the dispersion of the polyamide resin is preferably dried for about 1 to 5 minutes at about 100–125° C. In the case where it is desired to coat one surface with the aminealdehyde resin solution containing a toothing agent as described in the above co-pending application, it is preferable to coat this layer first and dry it for about 20 to 40 seconds at about 70 to about 95° C. and then cure it by further heating at 110 to 125° C. for about 3 to 5 minutes.

The drafting films made as described above not only are readily receptive to initial pencil and ink marking with the usual type of drafting instruments but the marking can be erased and re-marked without resorting to reconditioning the surface with french chalk or other expedients. The films also have the high degree of flexibility and dimensional stability of the film base referred to above. In addition, the films of the invention can be easily diazo sensitized from aqueous or non-aqueous solutions. Although inorganic toothing agents can be used if desired, the discrete polyamide resin particles are of sufficient hardness to offer a good drawing surface for pencils of hardness grade 6H to 9H. The invention will be further illustrated by, but is not intended to be limited to, the following examples.

*Example I*

A dimensionally stable vinylidene chloride/methyl acrylate/itaconic acid copolymer-coated polyethylene terephthalate as described in Example IV of Alles, U.S. Patent 2,779,684, was coated with an aqueous dispersion of an interpolyamide formed from hexamethylenediammonium adipate, hexamethylenediammonium sebacate and caprolactam made according to Example I of Brubaker, U.S. Patent 2,285,009. The aqueous dispersion was made in the manner described in Example III of Cairns, U.S. Patent 2,467,186. To 1000 grams of said aqueous dispersion containing 10% solids by weight of said interpolyamide there was added 5 moles of a 5% solution of a sodium alkyl naphthalene sulfonate. The dispersion was coated on one surface of the above-described film base at 55 feet per minute using a conventional air knife doctor to control the layer thickness. The coating was dried at 180° F. for about 1½ minutes to give a layer 0.2 to 0.3 mil in thickness. The resulting film was found to be excellent as a drafting film. Sharp lines could be drawn thereon with drafting pencils of 9H hardness or a drafting pen with no indication of abrasion or breakthrough of the drafting surface. The film had good translucency which allowed accurate tracing and reproduction. Repeated erasures could be made with no impairment of the original characteristics of the surface to function in the above-described manner. The film had excellent ink receptivity with no tendency toward "feathering" or spreading. The film also showed no tendency to curl or to become non-planar. The film also had good wearing characteristics.

A portion of the above film was diazo-sensitized by the interpolyamide layer with a solution having the following composition:

| | | |
|---|---|---|
| Water | ml | 70 |
| Ethylene glycol | ml | 5 |
| Ethyl alcohol | ml | 2 |
| Alum | grams | 1 |
| Thiourea | do | 2 |
| Ammonium hydroxide | ml | 2 |
| p-Diazo-N-diethylaniline | grams | 3 |
| 10% aqueous saponin | ml | 3 |

Water to make 100 ml.

The resulting diazo-sensitized layer was dried and exposed to a line drawing by means of a suitable exposing light. The exposed layer was then developed in a developer having the following composition:

| | Grams |
|---|---|
| Borax | 50 |
| Sodium carbonate | 25 |
| Thiourea | 20 |
| Resorcinol | 16 |
| Mannitol | 30 |

Water to make 1000 ml.

A strong yellow-orange image was formed which had good brilliance and clarity.

Another portion of the above film was diazo-sensitized by impregnating the interpolyamide layer with a solution of the following composition:

| | | |
|---|---|---|
| Water | ml | 70 |
| Ethylene glycol | ml | 5 |
| Ethyl alcohol | ml | 2 |
| Citric acid | grams | 5 |
| Thiourea | do | 5 |
| Zinc chloride | do | 5 |
| 2,3-dihydroxynaphthalene-6-sulfonic acid | do | 4 |
| p-Diazo-N-diethylaniline | do | 3 |
| 10% aqueous saponin | ml | 3 |

Water to make 100 ml.

The resulting layer was dried and exposed to a line drawing by means of a suitable exposing light. The image was then developed by contacting the exposed layer with ammonia fumes. The image developed to a deep blue color on a white translucent to transparent background. The resulting image had good density and clarity.

*Example II*

A dimensionally stable vinylidene chloride/methyl acrylate/itaconic acid copolymer coated polyethylene terephthalate film described in Example I was coated on one surface with a solution containing a water-soluble guanidine-modified urea-formaldehyde resin described in Example I of assignee's copending U.S. application Serial No. 774,822, filed November 19, 1958, now U.S. Patent 2,964,423 issued December 13, 1960. After coating and drying the resin solution but before curing, the opposite surface of the film was coated with the interpolyamide aqueous dispersion of Example I above. The layer was then dried at 180° F. for about 2 minutes which at the same time cured the urea-formaldehyde layer as described in the above application.

Both surfaces of the resulting film were found to be excellent as drawing surfaces. Sharp lines could be drawn thereon with 6H or harder pencils or drafting pens with no indications of breakthrough of the drafting surfaces. Even though both layers have a degree of translucency, the film was sufficiently transparent to allow accurate tracing and reproduction. Either one or both of the surfaces could be diazo-sensitized with aqueous or alcoholic diazo-sensitizing compositions.

*Example III*

Example I was repeated except that the opposite surface of the film was coated with a composition made in the following manner. A water dispersion was made as follows:

| | Grams |
|---|---|
| Water | 300 |
| 1% solution of a carboxy vinyl resin (purchased from B. F. Goodrich Chemical Co. as "Carbopol" 934) | 100 |
| Silica (average particle size 2–4 microns) | 63 |
| TiO₂ (average particle size 2–5 microns) | 6 |
| Ottawa sand | 1200 |

The above mixture was sand milled for 7 minutes at high speed and filtered through a 40–60 mesh filter. Eighty grams of the above filtrate were added to 100 grams of the interpolyamide aqueous dispersion of Example I and the mixture was coated to give a wet layer thickness of 2 mils. The coating was dried at 248° F. for four minutes.

The resulting film was found to have excellent drafting surfaces on both sides of the film with some decrease in translucency due to the addition of the silica and titanium dioxide toothing agents. However, the film was still capable of being easily used for tracing and reproduction work. Both surfaces could be sensitized by applying aqueous or non-aqueous solutions of diazo or iron sensitizing compounds.

*Example IV*

A dimensionally stable vinylidene chloride/methyl acrylate/itaconic acid copolymer coated polyethylene terephthalate film described in Example I was coated on one surface with an aqueous dispersion of a polyamide formed from polyhexamethylene adipamide treated in the manner described in Example I of Catlin, U. S. Patent 2,342,387. The polyhexamethylene adipamide was coated as a 3.95% aqueous dispersion to give a wet coating thickness of 6 mils. The coated film was dried for 4 minutes at 120° C. to give a final dry thickness of 0.2 mil. The resulting film was found to be excellent as a drafting film for pencils up to 4H in hardness or a drafting pen with no indication of abrasion or breakthrough of the drafting surface.

*Example V*

Evample IV was repeated using a 5% aqueous dispersion of the polyhexamethylene adipamide to which there was added a 10% aqueous dispersion of the silicon dioxide used in Example III in an amount sufficient to provide a ratio of polyamide to pigment of 2/1. The dispersion was coated and dried as in Example IV to give a dry coated thickness of 0.3 mil. The resulting film was found to be excellent as a drafting film for pencils up to 9H in hardness and drafting pens and showed no indication of abrasion or breakthrough of the drawing surface.

The invention is not limited to the film structures or particular resin dispersions of the foregoing Examples. Other polyamide resins may be dispersed as taught by Cairns in U.S. Patent 2,467,186 which can be used in this invention to form suitable drafting surfaces and which may be diazo sensitized, e.g., those polyamides disclosed in U.S. Patents 2,071,250, 2,071,253, 2,130,948, 2,393,972 and 2,430,860.

The support need not necessarily be 4 mil polyethylene terephthalate film but may be composed of other dimensionally stable polyester films which are disclosed in Whinfield et al., U.S. Patent 2,465,319, bearing a thin layer of an adherent film-forming essentially hydrophobic copolymer as disclosed in Alles et al., U.S. Patent 2,627,088, and Alles, U.S. Patent 2,779,684, and patents referred to in the specifications of these patents. Other suitable supports are the polyethylene terephthalate/isophthalates of British Patent 766,290 and Canadian Patent 562,672 and those obtainable by condensing terephthalic acid or dimethylterephthalate with propylene glycol, diethylene glycol, tetramethylene glycol or cyclohexane-1,4-dimethanol(hexahydro-p-xylene alcohol).

A variation can be made in the drafting films described in the examples by varying the solids content of the polyamide dispersions, since such dispersions are usually stable over a wide range of solids content.

The invention offers a practical means of providing a tracing film having good transparency and good resistance to extremely hard drafting pencils and pens. It also provides an economical means of manufacture because of the use of aqueous systems instead of expensive solvent systems.

An important advantage of the novel drafting films of the invention is that they are flexible and do not tend to crease or become torn such as is characteristic of cloth or paper. They are durable and do not deteriorate upon aging and retain their excellent stability even upon fairly wide changes in atmospheric conditions. Although toothing agents may be desirable in certain instances, they are not ordinarily required because the resin particles are of sufficient hardness to be adequate. Further advantages are thus obtained in not requiring the presence of such agents in the aqueous polyamide coating compositions. The polyamide layers are very resistant to abrasion and do not become brittle or flake off from the film support during rough handling. The polyamide layers are also outstanding in their ability to accept aqueous or non-aqueous diazo sensitizing solutions.

What is claimed is:

1. A dimensionally stable drafting film comprising a flexible, biaxially-oriented, macromolecular polyester film corresponding to the polyesterification product of a dicarboxylic acid and a dihydric alcohol having on at least one surface, in order, (1) a thin layer of an adherent film-forming, essentially hydrophobic organic copolymer, and (2) a thin layer consisting essentially of resin particles ranging from 0.1 to 10 microns in size, said resin selected from the group consisting of polyamides and interpolyamides.

2. A dimensionally stable drafting film comprising a flexible, biaxially-oriented, macromolecular polymethylene terephthalate film of from 3 to 10 mils in thickness, having on at least one surface, in order, (1) a layer of a vinylidene chloride copolymer containing at least 35% by weight vinylidene chloride in an amount of from 0.5 to 4 mg./dm.², and (2) a layer of resin selected from the group consisting of polyamides and interpolyamides, of from 1 to 5 mils in thickness and consisting essentially of resin particles ranging from 0.1 to 10 microns in size.

3. A drafting film according to claim 2 wherein said vinylidene chloride copolymer is a vinylidene chloride/acrylic ester/itaconic acid copolymer containing said ingredients in the respective amounts of 35 to 96%, 3.5 to 64.5% and 0.5 to 25% by weight.

4. A drafting film according to claim 2 wherein said copolymer is a vinylidene chloride/methyl acrylate/itaconic acid copolymer containing said ingredients in the respective amounts of 75 to 95%, 4 to 20%, and 1 to 5% by weight.

5. A drafting film according to claim 2 wherein said layer of resin contains uniformly dispersed, finely-divided discrete particles of a water-insoluble, translucence-producing, solid inorganic toothing agent having an average particle size of from 0.1 to 10 microns.

6. A drafting film according to claim 5 wherein said toothing agent is silica having an average particle size of from 0.2 to 4 microns.

7. A drafting film according to claim 2 of from 3 to 8 mils in thickness, the entire film exhibiting a shrinkage of not more than 0.2% both in the longitudinal and lateral directions when heated free from tension to a temperature of 120° C. for a period of five minutes.

8. A dimensionally stable drafting film comprising a flexible, biaxially-oriented, macromolecular polymethylene terephthalate film of from 3 to 10 mils in thickness, having on at least one surface, in order, (1) a layer of a vinylidene chloride copolymer containing at least 35% by weight vinylidene chloride in an amount of from 0.5 to 4 mg./dm.$^2$, and (2) a layer of resin 1 to 5 mils in thickness and consisting essentially of resin particles ranging from 0.1 to 10 microns in size, said resin being an interpolyamide corresponding to an interpolymer of hexamethylenediammonium adipate, hexamethylenediammonium sebacate and caprolactam having a modulus of stiffness from about $20 \times 10^3$ to about $50 \times 10^3$ lbs./sq. in.

9. A dimensionally stable drafting film comprising a flexible, biaxially-oriented, macromolecular polymethylene terephthalate film of from 3 to 10 mils in thickness, having on at least one surface, in order (1) a layer of a vinylidene chloride copolymer containing at least 35% by weight vinylidene chloride in an amount of from 0.5 to 4 mg./dm.$^2$, and (2) a layer of resin 1 to 5 mils in thickness and consisting essentially of resin particles ranging from 0.1 to 10 microns in size, said resin being an interpolyamide corresponding to an interpolymer of at least three of the polyamide-forming compositions selected from the group consisting of 6-aminocaproic acid, hexamethylenediamine-adipic acid salt, hexamethylenediamine-sebacic acid salt, and mixed salts of hexamethylenediamine with suberic and azelaic acids.

10. A dimensionally stable drafting film comprising a flexible, biaxially-oriented, macromolecular polymethylene terephthalate film of from 3 to 10 mils in thickness, having on at least one surface, in order, (1) a layer of a vinylidene chloride copolymer containing at least 35% by weight vinylidene chloride in an amount of from 0.5 to 4 mg./dm.$^2$, and (2) a layer of resin 1 to 5 mils in thickness and consisting essentially of resin particles ranging from 0.1 to 10 microns in size, said resin being a polyamide corresponding to a polymer of hexamethylenediamine and adipic acid, and having a modulus of stiffness of about $20 \times 10^3$ to about $50 \times 10^3$ lbs./sq. in.

References Cited by the Examiner
UNITED STATES PATENTS

| | | | |
|---|---|---|---|
| 2,342,387 | 2/1944 | Catlin | 117—161 X |
| 2,467,186 | 4/1949 | Cairns | 260—29.2 |
| 2,748,027 | 5/1956 | Meier | 117—76 |
| 2,770,566 | 11/1956 | Ritter | 117—72 |
| 2,831,783 | 4/1958 | Swiss et al. | 117—138.8 |
| 2,964,723 | 12/1960 | Van Stappen | 117—138.8 X |
| 3,006,761 | 10/1961 | Reichel et al. | 117—138.X |

References Cited by the Applicant
UNITED STATES PATENTS

| | | |
|---|---|---|
| 2,678,285 | 5/1954 | Browning. |
| 2,703,756 | 3/1955 | Herrick et al. |
| 2,718,476 | 9/1955 | Eichorn. |
| 2,873,207 | 2/1959 | Weegar et al. |

RICHARD D. NEVIUS, *Primary Examiner.*